(Model.) 2 Sheets—Sheet 1.
W. H. DENNISON.
EGG BEATER.
No. 454,165. Patented June 16, 1891.
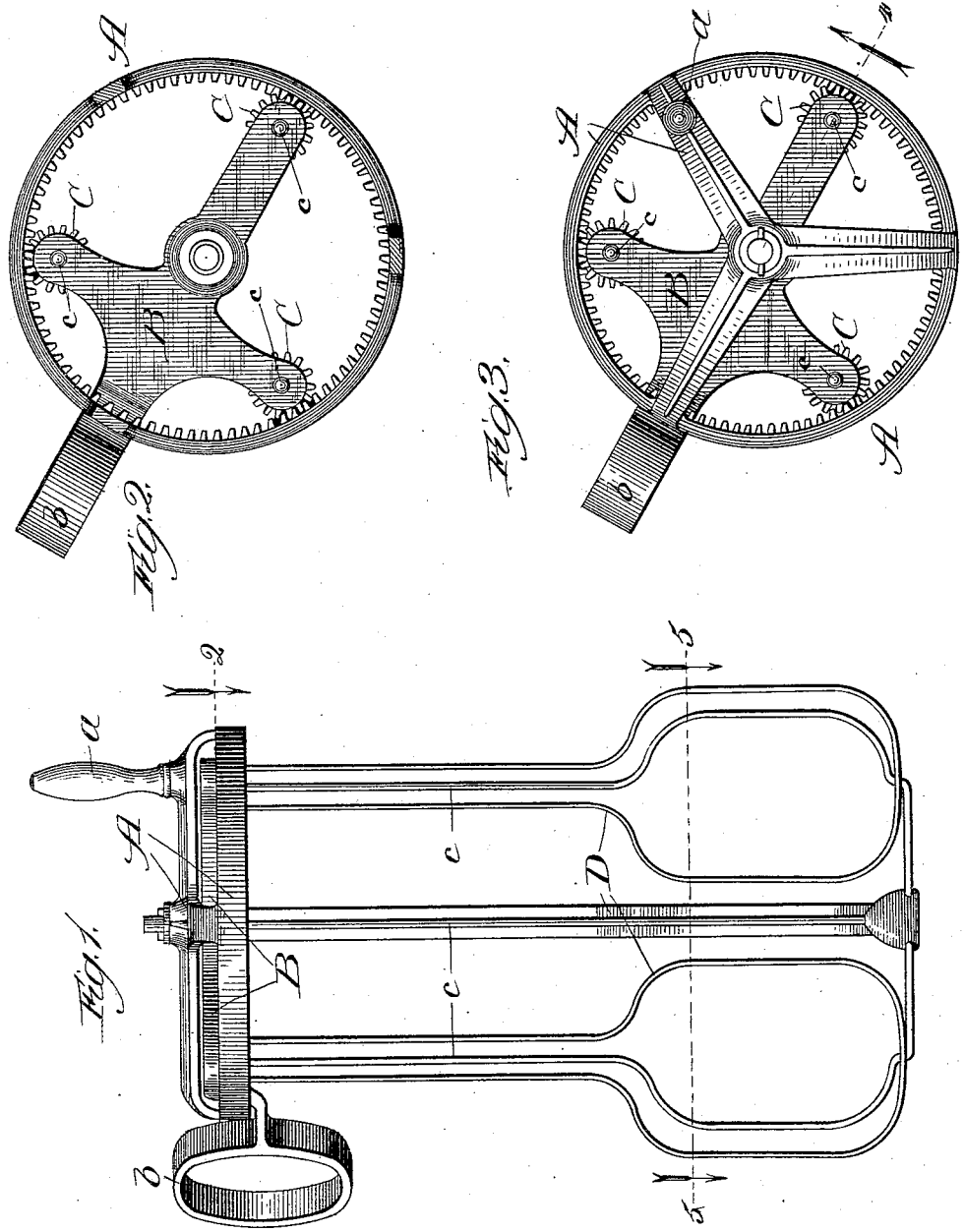
Witnesses:
Chas. E. Gaylord,
Clifford J. White.
Inventor:
William H. Dennison,
By Banning & Banning & Payson
Attys (Model.) 2 Sheets—Sheet 2.
W. H. DENNISON.
EGG BEATER.
No. 454,165. Patented June 16, 1891.
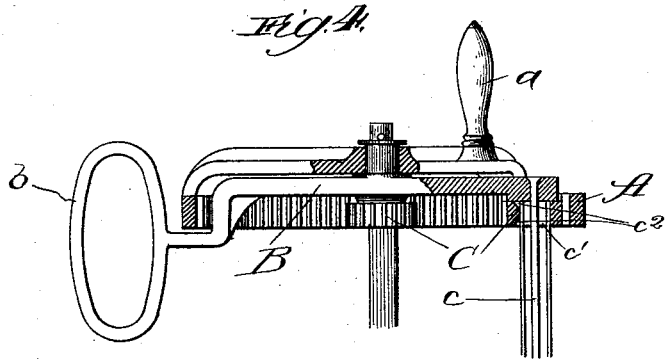
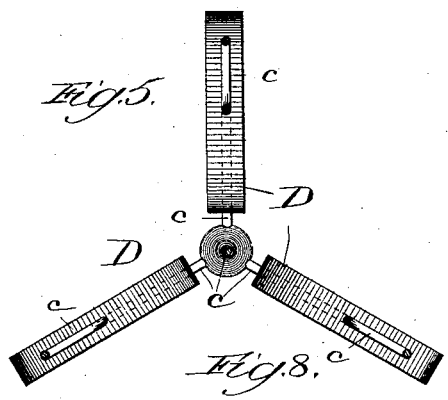
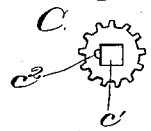
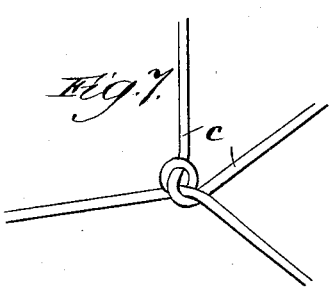 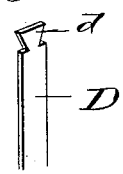 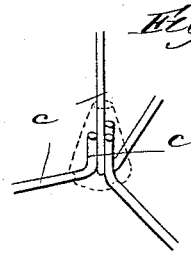
Witnesses:
Inventor:
William H. Dennison
By Banning & Banning & Payson,
Att'ys

UNITED STATES PATENT OFFICE.

WILLIAM H. DENNISON, OF HINSDALE, ILLINOIS.

EGG-BEATER.

SPECIFICATION forming part of Letters Patent No. 454,165, dated June 16, 1891.

Application filed June 19, 1890. Serial No. 355,918. (Model.)

*To all whom it may concern:*

Be it known that I, WILLIAM H. DENNISON, of Hinsdale, Du Page county, Illinois, have invented a new and useful Improvement in Egg-Beaters, of which the following is a specification.

The object of my invention is to make a simple economical beater for the whipping of eggs, cream, dough, &c.; and the invention consists in the combination hereinafter claimed.

In the accompanying drawings, Figure 1 is an elevation of my improved beater; Fig. 2, a plan sectional view taken in the line 2 of Fig. 1; Fig. 3, a plan view of the beater; Fig. 4, a sectional view taken in line 4 of Fig. 3; Fig. 5, a sectional view taken in line 5 of Fig. 1; Figs. 6 and 7, perspective views illustrating the crossing and fastening of the wires at the base; Fig. 8, a bottom plan view of one of the pinions detached, and Fig. 9 a perspective view of the upper end of one of the beater-arms.

A is the gear-wheel at the top of the beater, and $a$ a handle extending upwardly therefrom; B, the head or bearing plate for the pinions, and $b$ a handle thereon; C, pinions meshing or engaging with the gear-wheel; $c$, wires extending down from the pinions and head-plate to form the frame; $c'$, recesses in the pinions for fastening the ends of the beater-arms, and $c^2$ notches or recesses in the pinions for holding the metal plug used to secure the beaters therein; D, beater-arms secured to the pinions and having bearings in the frame near the bottom, and $d$ flaring portions at the upper end of the beater-arms for securing them to the pinions.

In making my improved beater I place a gear-wheel, preferably an internal gear-wheel, at the top, and arrange pinions, preferably recessed, so as to mesh or engage therewith. These pinions are independent or separate and engage directly with the gear-wheel, and not with each other. To each of these pinions I secure a beater-arm, as hereinafter described, so that the turning of the gear-wheel by the upwardly-extending handle will cause the arms to revolve for beating or whipping purposes.

The beater-arms, formed of band metal in the usual manner, are secured to the pinions in any convenient way; but I prefer to secure them by inserting a flaring portion of the band metal (see Fig. 9) in the recess of the pinions, (see Fig. 8,) and then running molten material, preferably Babbitt metal, into the recess, so that when cooled and hardened the plug formed by such material will securely and firmly hold the end of each beater-arm in its proper pinion. The notches in the recess serve to securely hold the cooled Babbitt metal or other material in place; but the plug may be rigidly secured or held in any other convenient way. The frame is formed of two wires, each of which extends down from the top through one of the pinions to a point slightly below the bottom of the beater-arms, and then, being bent, passes up through another one of the pinions or into the center of the head-plate. In this way one of the wires passes through two of the pinions, while the other simply passes through one pinion, its other end being secured in the center of the head-plate. Each wire of the frame is of course intended to be stationary or non-rotating, and is preferably bent in its lower half, so that as the beaters revolve around the bent portion it aids in the work of beating or whipping. The two frame-wires are crossed at the bottom, and at their point of crossing are firmly secured together by running molten material—say Babbitt metal—thereon (see Fig. 6) or by twisting or kinking the wires around or through each other at their point of crossing. (See Fig. 7.) In this way the frame is made firm and solid at its lower end.

In operation the beater is placed in the bowl or vessel containing the eggs or other material intended to be whipped, the lower part of its frame resting on the bottom thereof. The handle at the side is grasped and held with one hand and the internal gear-wheel revolved with the other hand by means of the upwardly-extending handle. This revolving of the gear-wheel of course causes the pinions and beaters-arms to revolve to perform their work of beating.

The advantages of my invention are that it enables the operator to beat or whip eggs, dough, or other material while sitting down; that the pinions, not engaging with each other, do not hitch or catch or otherwise stop or interfere with the movements of the beater-arms, and that it has three beater-arms running separately, which greatly facilitates the work of beating or whipping.

It will of course be understood that I do not intend to limit myself to all the details of construction above described. On the contrary, I intend to vary the construction or to use other forms or equivalents, as circumstances may render expedient.

I claim—

In a beater, the combination of a gear-wheel and head-plate, pinions engaging with the gear-wheel, beater-arms extending down from the pinions, and a frame formed by passing two wires down through two of the pinions and bending and crossing them to form the bottom of the frame and then extending them up, one through a third pinion and the other into the center of the head-plate, substantially as described.

WILLIAM H. DENNISON.

Witnesses:
EPHRAIM BANNING,
ANNIE C. COURTENAY.